(12) United States Patent
Kamioka et al.

(10) Patent No.: US 8,351,648 B2
(45) Date of Patent: *Jan. 8, 2013

(54) APPARATUS FOR CONTROLLING DIRECTION OF LIGHT FROM ON-VEHICLE HEADLIGHTS

(75) Inventors: Takahiro Kamioka, Kariya (JP); Yasutoshi Horii, Nagoya (JP); Junichi Hasegawa, Kariya (JP); Kenji Kobayashi, Nagoya (JP)

(73) Assignee: Denso Corporation, Kariya (JP)

( * ) Notice: Subject to any disclaimer, the term of this patent is extended or adjusted under 35 U.S.C. 154(b) by 992 days.

This patent is subject to a terminal disclaimer.

(21) Appl. No.: 12/207,778

(22) Filed: Sep. 10, 2008

(65) Prior Publication Data
US 2009/0067184 A1   Mar. 12, 2009

(30) Foreign Application Priority Data
Sep. 10, 2007   (JP) .................................. 2007-234336

(51) Int. Cl.
    *G06K 9/00* (2006.01)
(52) U.S. Cl. .................................................. 382/103
(58) Field of Classification Search .................. 382/103
    See application file for complete search history.

(56) References Cited

U.S. PATENT DOCUMENTS

| | | | |
|---|---|---|---|
| 5,796,094 A * | 8/1998 | Schofield et al. | 250/208.1 |
| 6,343,869 B1 * | 2/2002 | Kobayashi | 362/37 |
| 2002/0039294 A1 * | 4/2002 | Okuchi et al. | 362/464 |
| 2003/0107323 A1 * | 6/2003 | Stam | 315/82 |
| 2008/0088481 A1 * | 4/2008 | Kumon et al. | 340/937 |
| 2008/0180528 A1 * | 7/2008 | Saito | 348/148 |
| 2009/0045323 A1 * | 2/2009 | Lu et al. | 250/208.1 |

FOREIGN PATENT DOCUMENTS

| | | |
|---|---|---|
| JP | H06-270733 | 9/1994 |
| JP | H08-040140 | 2/1996 |
| JP | 08-221700 | 8/1996 |
| JP | 2001-026236 | 1/2001 |
| JP | 2003-335171 | 11/2003 |
| JP | 2004-500279 | 1/2004 |
| JP | 2004-098971 | 4/2004 |
| JP | 2005-041293 | 2/2005 |
| WO | WO 01/70538 | 9/2001 |
| WO | WO 2008024639 A2 * | 2/2008 |

OTHER PUBLICATIONS

Japanese Office Action dated Aug. 18, 2009, issued in corresponding Japanese Application No. 2007-234336, with English translation.
Japanese Office Action dated Nov. 10, 2009, issued in corresponding Japanese Application No. 2007-234336, with English translation.

* cited by examiner

*Primary Examiner* — Bhavesh Mehta
*Assistant Examiner* — Nirav G Patel
(74) *Attorney, Agent, or Firm* — Nixon & Vanderhye P.C.

(57) ABSTRACT

An apparatus is provided to control an angle of a light axis of light from headlights mounted on a vehicle. In the apparatus, images of a field of view in front of the vehicle are captured, and the captured images are used to detect taillights of a preceding vehicle. A illumination target position is set by using, as a positional reference, a position of the detected taillights in the captured images, and the angle of the light axis is directed to the illumination target position. The command is provided to an angle changing device, where the provided command depends on the angle calculated. The angle changing device changes the direction of the light axis of the light at an angle commanded by the command.

16 Claims, 6 Drawing Sheets

APPARATUS FOR CONTROLLING DIRECTION OF LIGHT FROM ON-VEHICLE HEADLIGHTS

CROSS-REFERENCE TO RELATED APPLICATION

This application is based on and claims the benefit of priority from earlier Japanese Patent Application No. 2007-234336 filed Sep. 10, 2007, the description of which is incorporated herein by reference.

BACKGROUND OF THE INVENTION

1. Technical Field of the Invention

The present invention relates to an apparatus for controlling headlights mounted on a vehicle, and in particular, to the apparatus for controlling the angle of a light axis of light to be radiated from the headlights in consideration of preceding vehicles which run ahead of the vehicle equipped with the apparatus.

2. Description of the Related Art

Recently there have been known techniques to control the light axes of the head lights of a vehicle. One such technique is for preventing a vehicle's driver from being dazzled by light radiated by a vehicle running behind. This technique is disclosed by International Patent Publication No. 2001/070538, for example, in which a distance from a preceding vehicle is detected and, on the basis of the detected distance, the direction (i.e., angle) of light axes of headlights is controlled. Practically, in the foregoing publication, as the distance is shorter, the light-axis direction of the head lights is lowered downward. That is, when the distance is longer, the light-axis direction of the head lights is raised upward.

However, the foregoing publication discloses only a conception, not a practical control way. Hence, relying on this disclosed technique is insufficient for controlling appropriately and smoothly the light-axis direction of the head light. For example, when the light-axis direction is controlled excessively upward, the driver in a preceding vehicle may be dazzled by the upwardly radiated light. In contrast, an excessively downward light-axis direction may cause a dark area between the area lit by the headlights of the vehicle and a preceding vehicle running in front of the vehicle.

SUMMARY OF THE INVENTION

The present invention has been achieved in view of the foregoing circumstances, and an object of the present invention is to provide a headlight swivel control apparatus which is capable of preventing the foregoing conventional drawbacks, such as dazzling the driver of a preceding vehicle and causing a dark area ahead of a vehicle.

In order to achieve the above object, there is provided an apparatus for controlling an angle of a light axis of light to be radiated from headlights mounted on a vehicle, comprising: angle changing means for changing the direction of the light axis of the light at an angle commanded by a command; image capturing means for capturing images of a field of view in front of the vehicle and providing captured images; taillight detecting means for using the captured images to detect taillights of a preceding vehicle which runs ahead of the vehicle provided with the apparatus; position setting means for setting an illumination target position using, as a positional reference, a position of the detected taillights in the captured images; angle calculating means for calculating the angle of the light axis of the light so that the light axis is directed to the illumination target position; and angle commanding means for providing the command to the angle changing means, the provided command depending on the angle calculated by the angle calculating means.

Accordingly, the angle (i.e., direction) of the light axis of light from the headlights is always controlled so that the light axis is directed to the illumination target position. This target position is set by using, as a positional reference, a position of the detected taillights in the captured images. Hence, the angle of the light axis can be controlled to prevent the light from the headlights from dazzling the driver of a preceding vehicle and not to cause a dark area between the preceding vehicle and a light field illuminated by the light from the headlights.

DESCRIPTION OF THE PREFERRED EMBODIMENT

Referring to FIGS. 1-6, an embodiment of the present invention will now be described.

Figure 1:
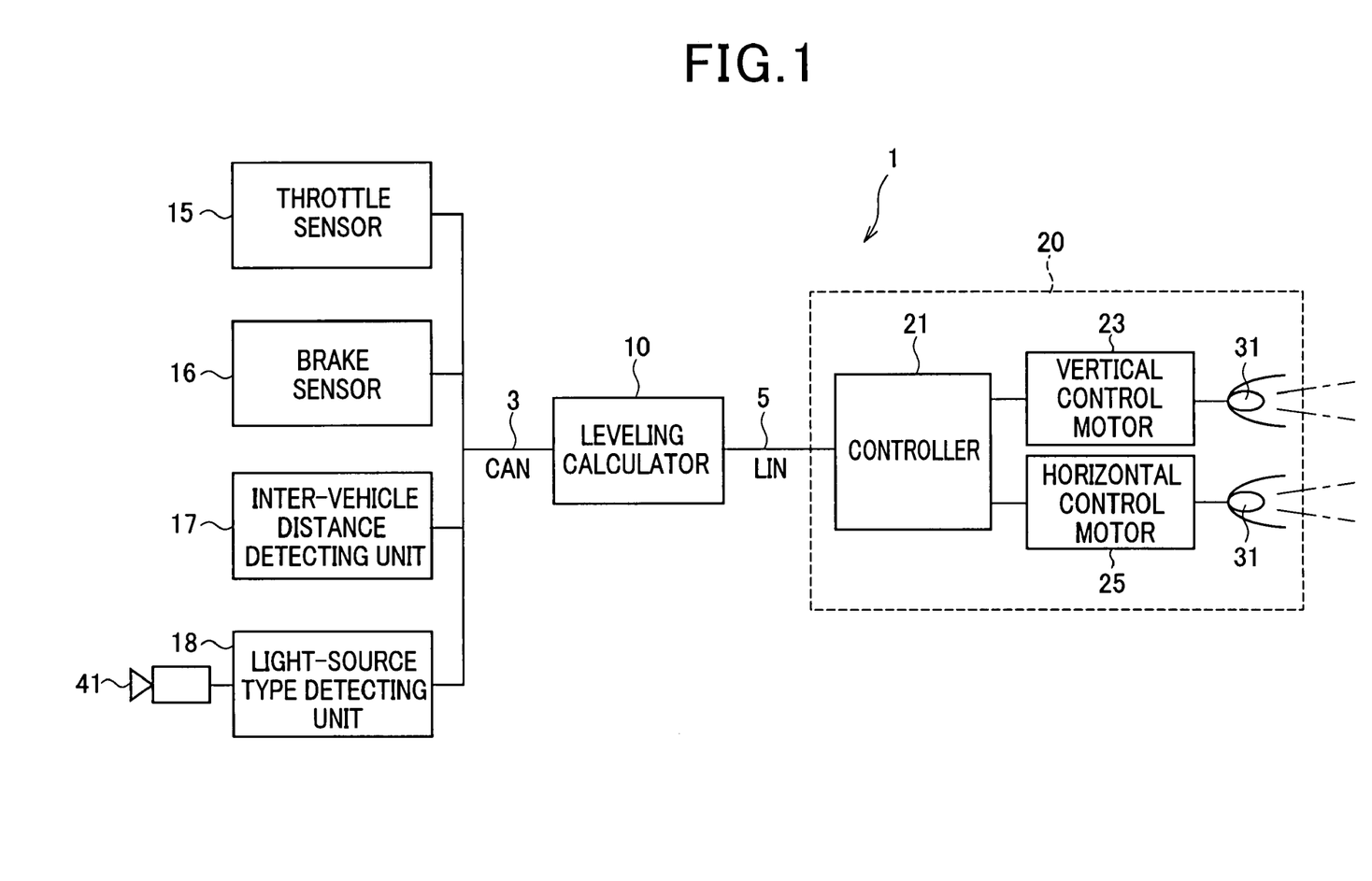
FIG. 1 is a block diagram showing an outlined structure of a headlight control apparatus, which is functionally provided with a light-axis direction controller according to an embodiment of the present invention.

FIG. 1 is a block diagram showing the structure of a headlight control apparatus 1 according to the present embodiment.

The headlight control apparatus 1, which is mounted in vehicles so such as passenger cars, is provided with a CAN (Controller Area Networks) communication line 3 working on a LAN protocol, a LIN (Local Interconnect Network) communication line 5 working on LIN protocol, a leveling calculator 10, a throttle sensor 15, a brake sensor 16, a inter-vehicle distance detecting unit 17, a light-source type detecting unit 18, and a headlight unit 20. The LAN communication line 3 connects the leveling calculator 10 and the group consisting of the throttle sensor 15, brake sensor 16, inter-vehicle distance detecting unit 17, and light-source type detecting unit 18. The LIN communication line S connects the leveling calculator 10 and the headlight unit 20. The term "leveling" used in the present embodiment means leveling for the light illuminated toward a preceding vehicle.

The throttle sensor 15 is incorporated inside an engine mounted in a vehicle in which the headlight control apparatus 1 is also mounted.

This throttle sensor 15 is mounted to detect to what degree a throttle valve is opened, and send to the leveling controller 10 a signal indicative of an opening degree of the throttle via the CAN communication line 3. The throttle valve is used to adjust the amount of air to the engine.

The brake sensor 16 is provided in the vehicle so as to detect a driver's force on the brake pedal (i.e., brake operating force), and sends to the leveling calculator 10 a signal indicative of the brake operating force via the CAN communication line 3.

The inter-vehicle distance detecting unit 17 is for instance a radar or a sonar that radiates electromagnetic waves or sound waves frontward of the vehicle in which the headlight control apparatus 1 is also mounted. This distance detecting unit 17 has the capability of detecting distances between the vehicle and obstacles such as a leading preceding vehicle which runs ahead. Such obstacles reflect the waves, so that periods of time from the radiation of the waves and the detection of reflected waves can be used to calculate the distances. The inter-vehicle distance detecting unit 17 sends detected distances, in the form of corresponding signals, to the leveling calculator 10 via the CAN communication line 3.

The inter-vehicle distance detecting unit 17 may be provided in another form. For example, the unit is accompanied by a camera 41 secured to the vehicle to image the forward view thereof. Images captured by the camera 41 are captured so that the images are processed by a predetermined image processing algorithm for detecting a preceding vehicles running in the same direction as the present vehicle as well as inter-vehicle distances of oncoming vehicles running in the opposite direction to the present vehicle. Signals indicative of detected results are sent to the leveling calculator 10 via the CAN communication line 3.

In this case, there are some processing methods to calculate the inter-vehicle distances. For example, images of the headlights and/or taillights of the leading and/or oncoming vehicles are detected from the captured images, and the inter-vehicle distances are calculated depending on vertical positions of the headlights and/or taillights in the vertical directions of the captured images. Another processing way is to detect pairs of lights in captured images and to calculate the inter-vehicle distance based on the interval of each pair of lights imaged in captured images.

The light-source type detecting unit 18 receives the captured images of the camera 41, and uses the images to decide the type of light sources in the captured images taken by the camera 41. This decision process will be detailed later. In the present embodiment, the camera 41 is provided as a full color camera equipped with color filters that separate the captured images into RGB (red-green-blue) components.

The light-source type detecting unit 18 is able to respond to a transmission request from the leveling calculator 10 by transmitting the selected light source type together with positional information indicative of the lower-end coordinate of each paired light source, to the leveling calculator 10 via the CAN communication line 3.

The leveling calculator 10 is a known microcomputer provided with a CPU, ROM, RAM and other necessary members. This leveling calculator 10 acquires detected signals of the throttle sensor 15, brake sensor 16, inter-vehicle distance detecting unit 17, and light-source type detecting unit 18 via the CAN communication line 3. Using such detected signals, that is, detected pieces of information, this leveling calculator calculates an angle (illumination angle) along which the light axis of lamps 31 of the headlight unit 20 (refer to FIG. 2) is directed. Practically, as will be described, the headlight unit 20 is provided with two lamps, that is, headlights, each being directed by an independent or common light axis.

In addition, in this leveling calculator 10, the pieces of detected information coming via the communication lines 3 and 5 are stored in the RAM of this calculator 10.

In order to control the actual light axis directed from the lamps 31 based on the calculated illumination angle, the leveling calculator 10 transmits to the headlight unit 20 a control command specifying the light illumination angle via the LIN communication line 5. This control command includes, at least, information indicating the vertical-directional angle position of the light axis (that is, in the anteroposterior direction of the vehicle, along which the vehicle runs). This control command may additionally include information indicating the horizontal angle position of the light axis (that is, in the horizontal (right-and-left) direction of the vehicle, which is perpendicular to the vertical direction).

This light illumination angle calculated by the leveling calculator 10 represents a difference from a predetermined angle, which is preset as a reference angle. By way of example, the reference angle is set to an angle which is in parallel with the road surface in the vertical direction and an angle which is the front of the vehicle in the horizontal direction.

The headlight unit 20, as it is known, is located at the right and left parts of the front of the vehicle. Hence the control command from the leveling calculator 10 is supplied to these right and left headlight units 20. For the sake of simplifying the explanation, FIG. 1 shows only one of the right and left headlight units 20.

Figure 2:
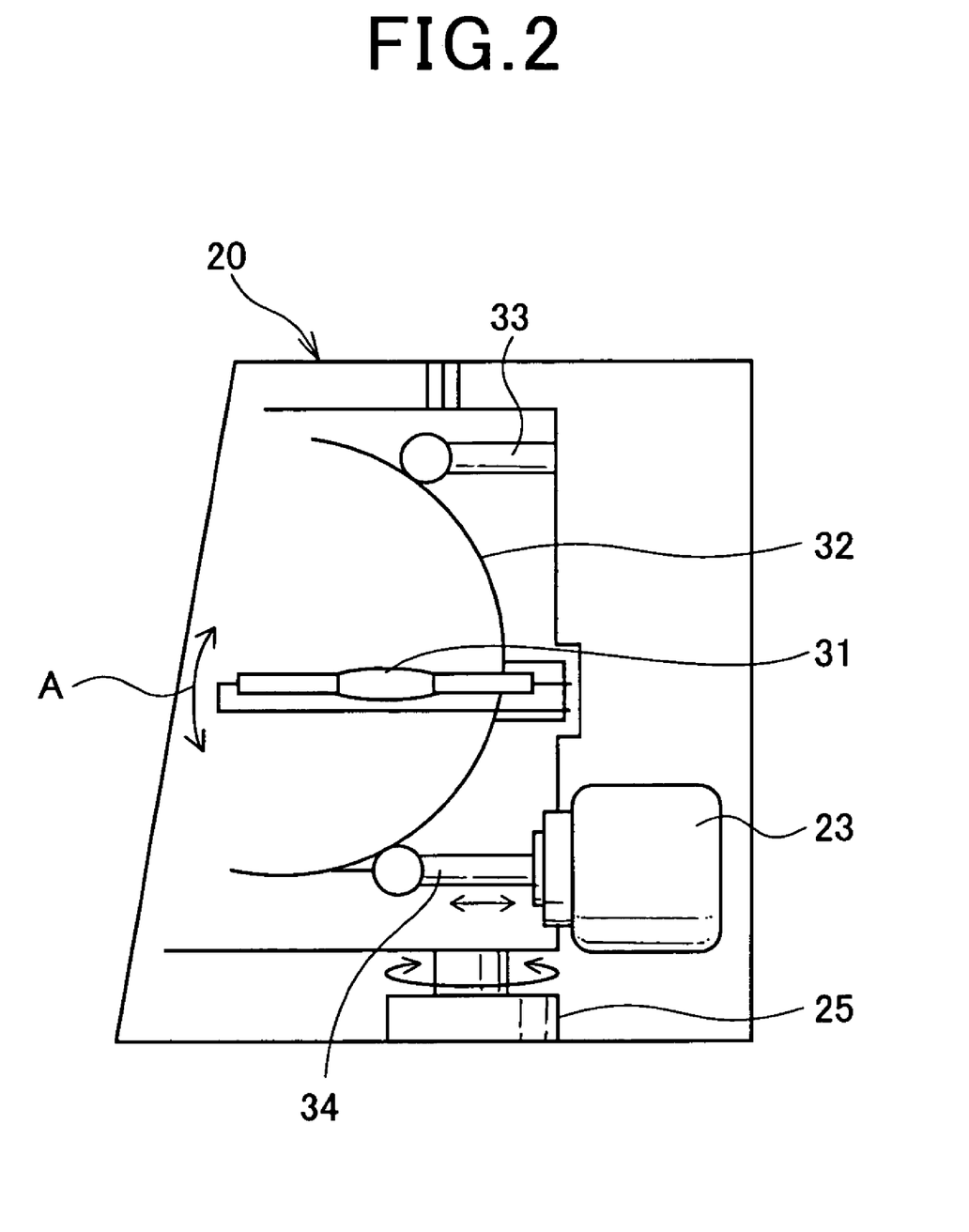
FIG. 2 is a sectional view showing an outlined structure of a headlight mounted in a vehicle in the embodiment.

As shown in FIGS. 1 and 2, each headlight unit 20 is provided with a controller 21 serving as light-axis angle changing means, a vertical control motor 23 for controlling the light-axis angle in the vertical direction, and a horizontal control motor 25 to control the light-axis angle in the horizontal direction. Further, as illustrated in FIG. 2, each headlight unit 20 is additionally provided with the lamp 31 and a reflector 32 fixed to the lamp 31 to reflect the light emitted from the lamp 31 in addition to a support member 33 and a movable member 34. The support member 33 swingably supports the reflector 32 in a circular-arc direction shown by an arrow "A". The movable member 34, which supports the reflector 32 in cooperation with the support member 33, is movable and holds the swung reflector 32.

The vertical control motor 23 responds to a control signal from the controller 21 to drive the movable member 34 so that this member 34 is moved in the vertical direction. This drive allows the light axis from the lamp 31 to be moved in the vertical direction.

The horizontal control motor 25 also responds to a command signal from the controller 21 to drive an assembly, composed of the lamp 31, reflector 32, support member 33, movable member 34, and vertical control motor 23, in the horizontal direction perpendicular to the vertical direction. Hence, by this drive, the light axis of the lamp 31 is moved in the horizontal direction. The motors 23 and 25 are stepping motors electrically driven by the control signal such that, since the control signal is pulsed signals, the rotation angle of each motor is in proportion to the number of inputted pulse signals.

In the similar way to the leveling calculator 10, the controller 21 is also provided as a known microcomputer with necessary members including a CPU, a ROM and a RAM. This controller 21 and the leveling calculator 10 may be provided as the same microcomputer which performs the processing of both of the leveling calculator 10 and the controller 21.

The controller 21 responds to the control command given by the leveling calculator 10 to electrically drive the vertical and horizontal control motors 23 and 25. Specifically, the controller 21 works to calculate an angular difference between the current light-axis angle to the reference angle and a light-axis illumination angle indicated by information contained in the control command from the leveling calculator 10. And the controller 21 works to output to the motors 23 and 25 a control signal to nullify the angular difference. In response to this control command to be outputted, the actual light-axis angle, along which the light is radiated actually, can be controlled by the control command issued from the leveling calculator 10.

Figure 3:
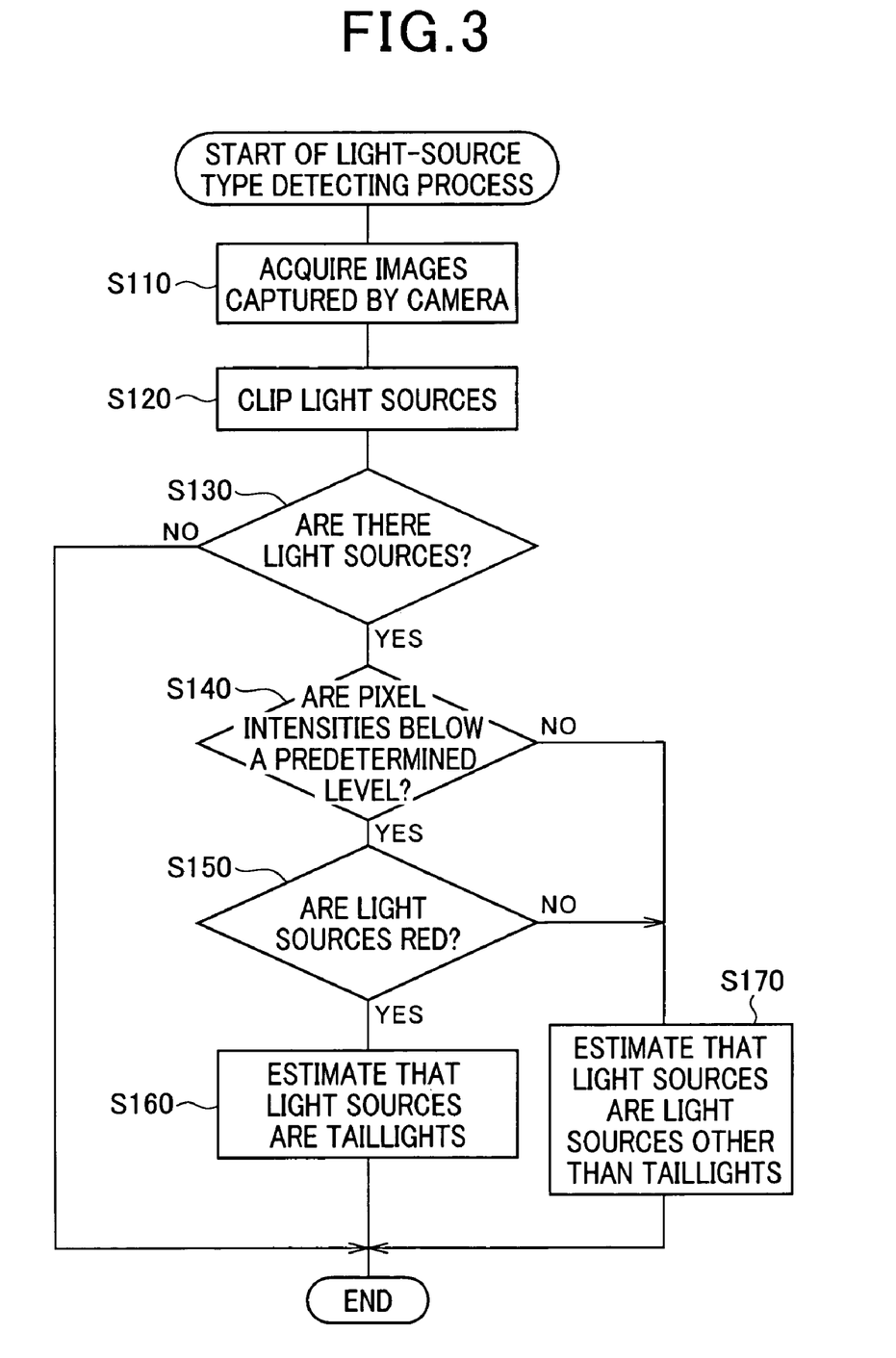
FIG. 3 is a flowchart showing decision of types of light sources.

Referring to FIG. 3, the process for detecting the types of light sources will now be de described. This process, which is executed by the light-source type detecting unit 18, functions as taillight detecting means.

This light-source type detecting process is initiated when a not-shown ignition switch is turned on. When being initiated, images captured by the camera 41 are read in from the camera 41 (step S110), and a process for clipping light sources from the captured images 8 are performed (step S120). In this clipping process of the light sources, the captured images are subjected to a predetermined image process that makes it possible to clip, pixel by pixel, regions whose intensities (luminance) are over a first intensity threshold, and to determine whether or not the clipped regions provide shapes which can be supposed to be light sources. The shapes are preset so as to imitate actual light sources (e.g., taillights) and patterned. The patterned shapes are stored in the memory beforehand. Hence the foregoing determination makes it possible to estimate whether or not the clipped regions represent actual light sources.

The light-source type detecting unit 18 then proceeds to the next step to determine whether or not light sources have been found at step S120 (step S130). When there is no light source in the captured images (NO at step S130), this light-source type detecting process is immediately ended.

In contrast, when the light sources have been found in the captured images (YES at step S130), the unit 18 proceeds to a step to estimate whether or not the intensity of the light sources is less than a predetermined value (step S140). In this estimation, a second intensity threshold, which is higher than the first intensity threshold, is used as the predetermined value, with the result that the light-source intensity can be estimated.

When the estimation at step S140 shows the intensity of the light sources is over the predetermined value (NO at step S140), the processing proceeds to step S170, which will be explained later. However, when it is estimated that the intensity of the light sources is less than the predetermined value (YES at step S140), a further process is executed to estimate whether or not the light sources are red (step S150). This estimation is conducted such that the captured images are subjected to separation into RGB components and the separated RGB components are then subjected to percentage calculation. In cases where, in the light source regions, the intensity of the G and B components is less than 10% of the intensity of the R component, it is decided that the light source is red.

When the light sources are estimated as being red (YES at step S150), the light-source type detecting unit 18 learns that the light sources are the taillights of a preceding vehicle. In this case, information showing that the light sources are the vehicle taillights is stored in the RAM (or another memory) together with information showing the coordinate of the lower end of the taillights shown in FIG. 5B (step S160). Then the light-source type detecting process is ended.

When it is estimated that the light sources are not red (NO at step S150), the unit 18 learns that the light sources are other than vehicle taillights. In this case, information showing that the light sources are not vehicle taillights is stored in the RAM (or another memory) together with information showing the coordinate of the lower end of the light sources (step S170), before ending the light-source type detecting process.

Figure 4A:
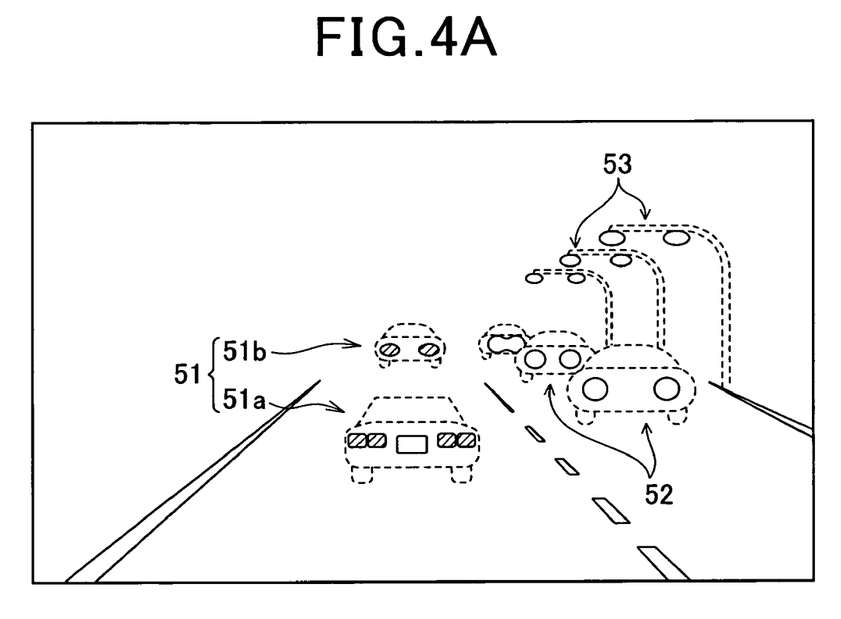
FIG. 4A is an illustration exemplifying a captured image.

Though not mentioned in particular, a plurality of light sources are clipped from the captured images through the process at step S120, and the steps S130 to S170 are carried out for each light process. Through this light-source type detecting process, as illustrated in FIG. 4A, the taillights of preceding vehicles 51 can be picked up from the captured images in a manner that those taillights are distinguished from the headlights of oncoming vehicles 52 and/or light sources such as road lights 53.

Figure 5A:
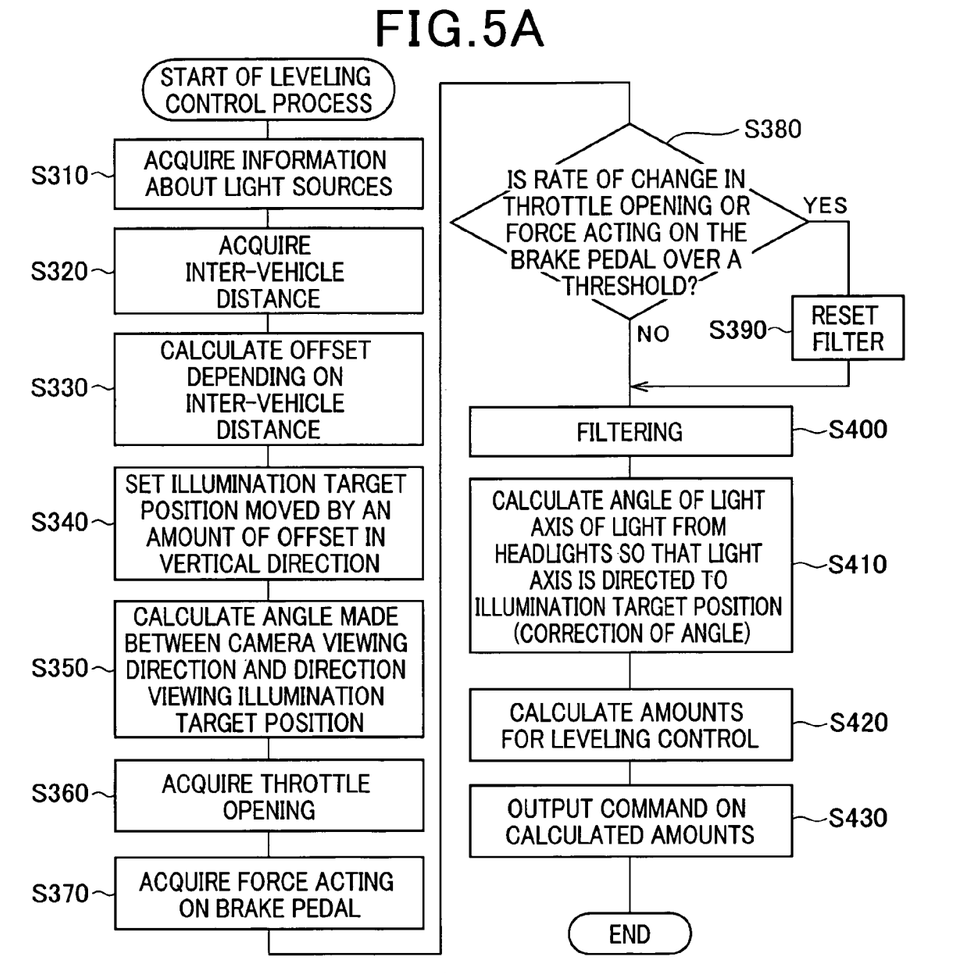
FIG. 5A is a flowchart showing a leveling control process.

Referring to FIG. 5A, a process for controlling the light axis of the headlights will now be described. This control process is called a leveling control process in the present embodiment, which is executed by the leveling calculator 10. This leveling control process functions as angle calculating means.

Similarly to the foregoing light-source type detecting process, the leveling control process is initiated in response to turning on the not-shown ignition switch. First of all, information indicative of light sources is acquired from the light-source type detecting unit 18 (step S310). Practically, the leveling calculator 10 requests the light-source type detecting unit 18 to transmit to the calculator 10 information indicative of the coordinate of the lower end of the taillights, which is stored in the RAM of the detecting unit 18 or other memory means. In response to this request, the light-source type detecting unit 18 transmits the read-out information to the leveling calculator 10, so that this calculator 10 stores the received information, that is, the coordinate of the lower end of the taillights in the RAM thereof.

In the present embodiment, the leveling control process is given to only a preceding vehicle 51a (refer to FIG. 4A) whose inter-vehicle distance from the vehicle with the headlight control apparatus 1 is minimum. Hence, of the information received from the light-source type detecting unit 18, only information indicative of the taillights of the preceding vehicle 51a is stored in the RAM of the leveling calculator 10. This storage is carried out such that, of the received information, the coordinates of the lower ends of the taillights for vehicles are compared with each other to select a coordinate located in a lowermost part of the captured images, and only information showing the coordinate of the lower end of the lowermost part is stored in the RAM.

A modification is that the light -source type detecting unit 18 is configured to prevent information showing the taillights of vehicles other than the smallest-distance preceding vehicle 51a, from being sent to the leveling calculator 10.

The leveling control process proceeds to the next step, where the leveling calculator 10 acquires information in relation to the inter-vehicle distances from the inter-vehicle distance detecting unit 17 (step S320). This process serves as inter-vehicle distance acquisition means. This process is carried out in the similar way to acquiring information indicative of the light-source types from the light-source type detecting unit 18.

Figure 4B:
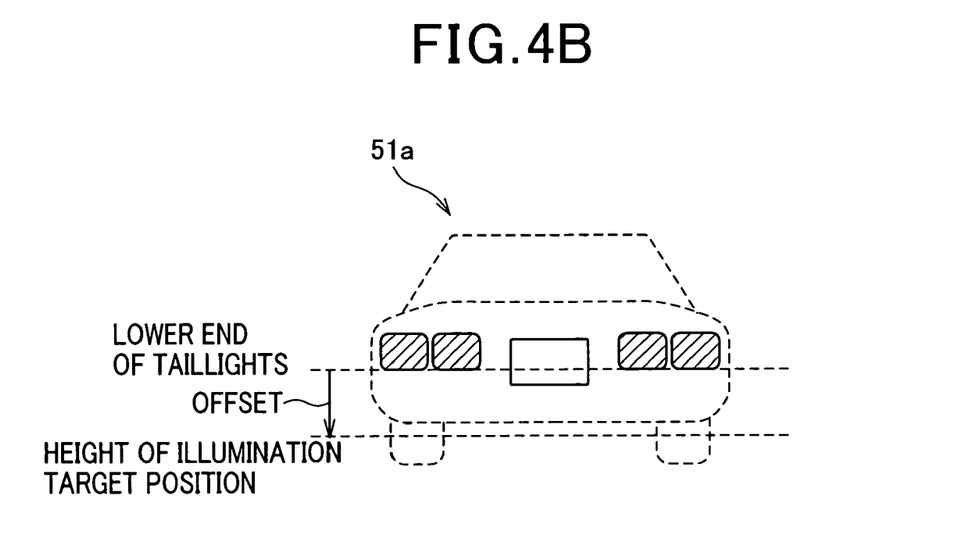
FIG. 4B is an illustration showing how to set targets to be light-radiated in the captured image.

The leveling control process further proceeds to calculation of an offset amount and setting of an illumination target (steps S330 and S340), which serves as illumination target changing means. The offset amount is calculated as a vertical length from the lower end of the taillights, in which the length depends on inter-vehicle distances. The illumination target, which is a vertical position to which the light axis of the headlights of the vehicle should be directed, is set by moving the vertical position downward from the lower end of the taillights by the offset amount, as shown in FIG. 4B.

Setting the offset amount is intended to move the illumination target position downward more than the lower end of the taillights of the preceding vehicle 51a. The intended position is nearly at the rear tires (or an area immediately behind) the rear tires of the preceding vehicle 51a.

By the way, depending on the distance from the preceding vehicle 51a, the size of the preceding vehicle in the captured images changes.

Hence, if the offset amount is set to be constant, the light emitted from the vehicle may results in illuminating either a preceding vehicle itself or part of the road far from a preceding vehicle (, thus leaving a dark area between the present vehicle and the preceding vehicle).

The leveling control process according to the present embodiment considers such a drawback. Specifically, the offset amount is changed in accordance with inter-vehicle distances, so that the illumination target position can be set roughly at the rear wheel tires of the preceding vehicle 51a, as illustrated at FIG. 4B. How to set the offset amount is described with reference to FIG. 6. A graph illustrated in FIG. 6 provides a relationship between offset amounts (represented by the number of pixels), which should be taken from the lower end of the taillights, and inter-vehicle distances.

In the image shown in FIG. 4A, which is viewed from the present vehicle equipped with the headlight control apparatus 1, the preceding vehicle 51a is less in the inter-vehicle distance than a further preceding vehicle 51b running ahead of the preceding vehicle 51a. Hence, the preceding vehicle 51a is displayed on a larger scale than the further preceding vehicle 51b in the captured images. In this case, the offset amount, which is a vertically downward length to be offset from the lower end of the taillights to the illumination target position the captured images, is set to be larger. The larger the inter-vehicle distance, the smaller the offset amount.

Figure 6:
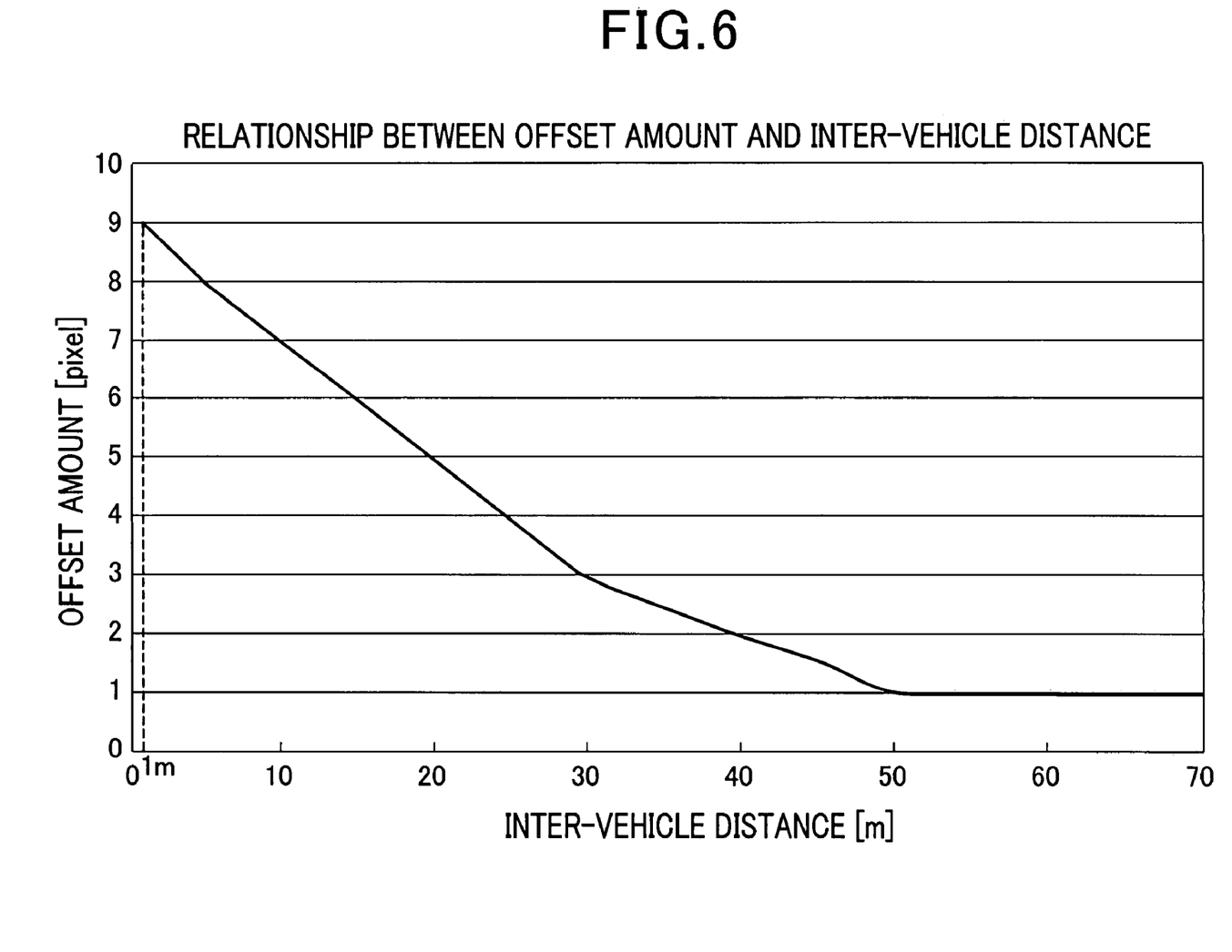
FIG. 6 is a graph showing an inter-vehicle distance and an offset value (expressed by the number of pixels) from a taillight lower end.

The graph shown in FIG. 6 exemplifies a condition where, when the inter-vehicle distance is 1 m or thereabouts, the offset amount takes a maximum of 9 pixels, and the offset amount decreases monotonically until an inter-vehicle distance of 50 m, which is followed by a constant 1 pixel at inter-vehicle distances over 50 m.

The leveling control process proceeds to the next step, where a vertical-directional angle Θ made between the attachment angle of the camera 41 and the illumination target position is calculated (step S350). The correspondence between the attachment angle of the camera 41 (i.e., the imaging direction of the camera) and the coordinates of the illumination target positions in images to be captured is made in advance. This means that specifying the coordinate of an illumination target position in a captured image provides the direction of an illumination target position corresponding to the attachment angle of the camera 41.

In the present embodiment, the attachment angle of the camera 41 is 0 degree in both the vertical and horizontal directions, which is a condition realized when the vehicle moves straight. Using this angle as a reference angle, a vertical-directional angle Θ is made between directions extending toward the reference angle and the illumination target position (refer to FIG. 5B). Incidentally, in the present embodiment, the calculated results (i.e., the values of the vertical-directional angle Θ) at step S350 are stored in the RAM of the leveling calculator 10 for a period of 1 second.

The leveling calculator 10 then receives the signals indicative of the throttle opening and the stepping force on the brake pedal from the throttle sensor 15 and the brake sensor 16, respectively (steps S360 and S370). That is, the signals of the throttle opening and the stepping force on the brake pedal are transmitted, at intervals, from the throttle sensor 15 and brake sensor 16 to the leveling calculator 10 respectively, and the transmitted signals are stored in the RPAM thereof. Such signals acquired for a unit time (for example, 1 second) are then read out from the RAM.

By the way, there is a possibility that a vehicle tilts largely in the anteroposterior direction for example when the vehicle is accelerated or decelerated suddenly. In such a case, in detecting the vertical-directional angle Θ of the light axis, only the newest calculated angle Θ is used, so that the angle Θ of the light axis can be changed quickly. On the other hand, when the vehicle runs without a sudden acceleration or deceleration, that is, the vehicle pitches slowly, an average over the calculated angles Θ for 1 second is used to prevent the light-axis control from being complex. Hence, it is preferred that the vertical-directional angle Θ of the light axis cannot be changed so frequently.

In consideration of this conditions, it is decided whether only the newest angle Θ calculated at step S350 is used as it is or an average of the angles Θ stored in the RAM over 1 second is used. This decision is performed alternatively by estimating whether or not the vehicle is in a sudden acceleration or deceleration. Practically, it is determined if or not a rate of changes in the throttle opening or a rate of changes in the stepping force on the brake pedal is equal to or larger than a predetermined threshold (step S380).

When the determination at step S380 is affirmative (YES at step S380), a filter is reset (that is, all the calculated angles Θ other than the newest angle in the RAM is cleared) (step S390). Then the calculated angle(s) Θ is subjected to filtering (step S400). The filtering is a process to calculate an average over the calculate angles Θ stored in the RAM. Hence when being reset at step S390, only the newest calculated angle Θ is outputted, as it is, as a filtered result at step S400.

In contrast, if the determination at step S380 is negative (NO at step S380), the filtering is performed without resetting the filter (step S400). In this case, therefore, an average over the calculated angles Θ for 1 second is outputted as a filtered result at step S400.

The leveling control process then proceeds to the next step, where, based on the attachment positions of the units and unit-to-unit distances, the angle of the light axis extending from the headlight unit 20 to the illumination target position is corrected (step S410). This correction will be detailed using FIG. 5B, which shows a geometrical relationship among the attachment positions of the camera 41 and the headlight unit 20, and the illumination target position.

Figure 5B:
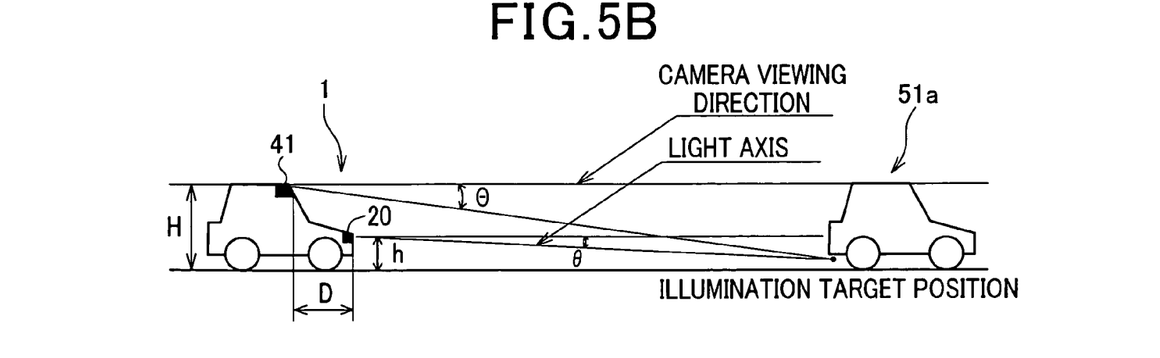
FIG. 5B is an illustration showing a geometrical relationship among a camera-attached position, a headlight-attached position, and a light-illumination target position.

From the geometry shown in FIG. 5B, the angle made between the attachment angle (direction) of the camera 41 and the direction extending toward the illumination target position of a preceding vehicle 51a is shown by Θ. The angle made between the attachment angle (direction) of the headlight unit 20 (, which is equal to that of the camera 41) and the direction extending toward the illumination target position of the preceding vehicle 51a is shown by Θ. The distance between the s camera 41 and the headlight unit 20 in the horizontal direction is D, the attachment height of the camera 41 is H, and the attachment height of the headlight unit 20 is h. In this case, the angle Θ made between the attachment angle of the headlight unit 20 and the direction toward the illumination target position is given by the following formula:

$$\Theta = -\tan^{-1}[h/(H/\tan\Theta - D)]$$

Thus, at step S410, the angle Θ is calculated for the correction.

Since the motors 23 and 25 in the headlight unit 20 are composed of stepping motors, the number of steps needed by the control signals, which are supplied from the controller 21 to the motors 23 and 25, is calculated (step S420). Practically, the angle Θ is divided by a control angle per unit step.

The leveling calculator 10 transmits to the headlight unit 20 the control command including the number of steps calculated above (step S430), before ending this leveling control process. The process at step S430 serves as angle command means.

In response to the control command issued from the leveling calculator 10, the controller 21 of the headlight unit 20 drives the motors 23 and 25 by the control signals in which the corrected angle Θ is reflected. Hence, the motors 23 and 25 are driven by the control signals to change the vertical-directional angle of the light axis of the light radiated from the headlights. Therefore, the light from the headlights is controlled so that its light axis is targeted to the rear tire wheels of the preceding vehicle. In other words, the light axis is always controlled downward in an appropriate but controlled manner.

Described above, in the present headlight control apparatus 1, the light-source type detecting process is performed, in which images of preceding vehicle are captured by the camera 41 and the taillights of a preceding vehicle 51a are detected from the captured images. Further, the leveling control process is performed by the leveling calculator 10. Through this leveling control process, the position of the detected taillights in the captured images is used as a reference, a desired s illumination target position is set to the preceding vehicle 51a, and the angle of the light axis extending from the headlight unit 20 to the illumination target position is calculated. In the present embodiment, the desired illumination target position is set to the rear wheel tires of the preceding vehicle 51a. That is, the illumination target position is set to be downward looking, compared to the position of the taillights of the preceding vehicle 51a.

Accordingly, it is possible to prevent the driver of a preceding vehicle from being dazzled due to the light from the headlights of the present vehicle, in addition it is also possible to prevent a dark area with no light from occurring between the preceding vehicle and the area illuminated by the headlights of the present vehicle.

Setting the illumination target position according to the present embodiment is still advantageous in a vehicle running condition where, for example, the present vehicle runs on a flat road followed by a declivous (downward sloping) road and a preceding vehicle runs on the declivous road. In this case, when viewed from the present vehicle, the preceding vehicle is located downward in the vertical direction. Even in this case, the illumination target position is set based on the positions of the taillights of the preceding vehicle captured by the camera, thus preventing the driver of the preceding vehicle being dazzled.

In addition, the leveling control process according to the present invention ignores the headlights of oncoming vehicles approaching the present vehicle, and is directed to only the taillights of a preceding vehicle. Hence, the direction of the headlights 31 will not be changed even when oncoming vehicles passes by the present vehicle at night. It is therefore possible to make the leveling control stable only on the taillights of a preceding vehicle, avoiding a dark area with no light being caused. In addition, the driver of the present vehicle can be prevented from suffering discomfort due to frequent light-axis changes brought about every time the oncoming vehicles pass by.

In the headlight unit 20 for vehicles normally used to run on a road, the illumination angle of light toward the oncoming lane(s) is narrow, so that dazzling the driver of an oncoming vehicle is suppressed. However, if the headlights 31 are directed excessively upward, the driver of an oncoming vehicle may be dazzled due to the light radiated from the present vehicle. To overcome this possibility, it is preferred to set an upper limit to the upward control of the headlights 31. This is realized by setting the upper limit to any of the light-axis angle controlled by the controller 21, the calculated angle by the leveling control process (step S150 or others), and the control command (step S430).

In addition, the light-source type detecting unit 18 is able to detect the taillights whose pixel intensities are over the first threshold appropriately designated and whose hue is within the predetermined hue ranges in detecting the taillights on the hue, it is possible to detect a red light source used as the taillights. Color filters, arranged in the camera 41, can be used to separate the light from light sources into RGB components. When the percentage of the R component to that of the G and B components is over a predetermined value, it can be decided that the light source is taillights. In this way, since the light source whose hue coincides with that of the taillights, it is possible to detect the taillights reliably.

In the leveling calculator 10, of the taillights detected in the captured images, the vertical-directional position of taillights located at a lowermost position in the captured images is used as a reference position. Using this reference position, the illumination target position can be set. Hence, when a plurality of sets of taillights are detected, it is possible to prevent all the drivers of plural preceding vehicles being dazzled.

Moreover, the leveling calculator 10 is able to correct the angle (that is, the direction) of the light axis of the light from the headlights 31 in consideration of the geometrical relationship among the headlight unit 20, the camera 14, and the illumination target position. Accordingly, even if the camera 41 and the headlight unit 20 are not so close to each other in terms of their attached positions, it is possible to correct the directional error of the light axis, which is due to the distance between the camera 41 and the headlight unit 20, thus setting the light axis in a controlled and reliable manner.

Furthermore, the leveling calculator 10 is able to change the illumination target position depending on the inter-vehicle distance. Hence, the illumination target posit-on can be placed at a lower fixed position than the taillights.

As modifications, the taillights may be detected by estimating the shapes of light sources and/or intensifies thereof, instead of the hue described in the foregoing embodiment. That is, it can be determined whether or not the shapes and/or intensities are within predetermined ranges. Of course, the shapes and/or intensities and the hue (color tone) can be combined with each other for more reliable detection of the taillights of preceding vehicles.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling a direction of a light axis of light to be radiated from headlights mounted on a vehicle, comprising:
   angle changing means for changing an angle of the light axis of the light to an angle commanded by a command;
   image capturing means for capturing images of a field of view in front of the vehicle and outputting captured images;
   taillight detecting means for using the captured images to detect taillights of a preceding vehicle which runs ahead of the vehicle provided with the apparatus;
   position setting means for setting an illumination target position based on a position of the detected taillights in the captured images, wherein the position setting means includes shifting means that shifts, by an offset amount which is changeable, the illumination target position down from the position of the detected taillights in each of the captured images in a vertical direction of the images;
   angle calculating means for calculating the angle of the light axis of the light so that the light axis is directed to the illumination target position;
   angle commanding means for providing the command to the angle changing means, the provided command depending on the angle calculated by the angle calculating means; and
   inter-vehicle distance acquiring means for acquiring an inter-vehicle distance between the vehicle provided with the apparatus and the preceding vehicle; and
   position changing means for changing the offset amount in the captured images depending on the inter-vehicle distance acquired.

2. The apparatus of claim 1, wherein the taillight detecting means is configured to detect, as the taillights, from the captured images, light sources having pixel intensities over a predetermined intensity threshold and having a hue which is within a predetermined hue range.

3. The apparatus of claim 2, wherein the position setting means is configured to set the illumination target position in accordance with a position of taillights which are positionally lowermost among the detected taillights in the captured images.

4. The apparatus of claim 3, wherein the angle calculating means is configured to calculate the angle of the light axis of the light depending on a distance between the image capturing means and the headlights both attached to the vehicle provided with the apparatus.

5. The apparatus of claim 1, wherein the position setting means is configured to set the illumination target position in accordance with a position of taillights which are positionally lowermost among the detected taillights in the captured images.

6. The apparatus of claim 5, wherein the angle calculating means is configured to calculate the angle of the light axis of the light depending on a distance between the image capturing means and the headlights both attached to the vehicle provided with the apparatus.

7. The apparatus of claim 1, wherein the angle calculating means is configured to calculate the angle of the light axis of the light depending on a distance between the image capturing means and the headlights both attached to the vehicle provided with the apparatus.

8. The apparatus of claim 1, wherein the position changing means is configured to change the offset amount such that, as the inter-vehicle distance increases, the offset amount becomes smaller.

9. An apparatus for controlling a direction of a light axis of light to be radiated from headlights mounted on a vehicle, comprising:
   angle changing means for changing an angle of the light axis of the light to an an angle commanded by a command;
   image capturing means for capturing images of a field of view in front of the vehicle and outputting captured images;
   taillight detecting means for using the captured images to detect taillights of a preceding vehicle which runs ahead of the vehicle provided with the apparatus;
   position setting means for setting an illumination target position based on a position of the detected taillights in the captured images, wherein the position setting means includes shifting means that shifts, by an offset amount which is changeable, the illumination target position down from the position of the detected taillights in each of the captured images in a vertical direction of the images;
   angle calculating means for calculating the angle of the light axis of the light so that the light axis is directed to the illumination target position; and
   angle commanding means for providing the command to the angle changing means, the provided command depending on the angle calculated by the angle calculating means; wherein
   the angle calculating means includes first means for calculating an angle between a view direction of the image capturing means and a direction viewing from the apparatus to the target radiation position, second means for determining the vehicle provided with the apparatus is in a predetermined acceleration or a predetermined deceleration, and third means for filtering the angles captured by the first means for a predetermined period of time depending on a determined result of the second means.

10. An apparatus for controlling a direction of a light axis of light to be radiated from headlights mounted on a vehicle, comprising:
   an angle changing device that changes an angle of the light axis of the light to an angle commanded by a command;
   an image capturing device that captures images of a field of view in front of the vehicle and outputting captured images;
   a taillight detecting device that uses the captured images to detect taillights of a preceding vehicle which runs ahead of the vehicle provided with the apparatus;
   a position setting device that sets a illumination target position based on a position of the detected taillights in the captured images, wherein the position setting device includes a shifting device that shifts, by an offset amount which is changeable, the illumination target position down from the position of the detected taillights in each of the captured images in a vertical direction of the images;
   an angle calculating device that calculates the angle of the light axis of the light so that the light axis is directed to the illumination target position;
   an angle commanding device that provides the command to the angle changing device, the provided command depending on the angle calculated by the angle calculating device;
   an inter-vehicle distance acquiring device that acquires an inter-vehicle distance between the vehicle provided with the apparatus and the preceding vehicle; and a position changing device that changes the offset amount in the captured images depending on the inter-vehicle distance acquired.

11. The apparatus of claim 10, wherein the taillight detecting device is configured to detect, as the taillights, from the captured images, light sources having pixel intensities over a predetermined intensity threshold and having a hue which is within a predetermined hue range.

12. The apparatus of claim 10, wherein the position setting device is configured to set the illumination target position in accordance with a position of taillights which are positionally lowermost among the detected taillights in the captured images.

13. The apparatus of claim 10, wherein the angle calculating device is configured to calculate the angle of the light axis of the light depending on a distance between the image capturing device and the headlights both attached to the vehicle provided with the apparatus.

14. The apparatus of claim 10, wherein the position changing means is configured to change the offset amount such that, as the inter-vehicle distance increases, the offset amount becomes smaller.

15. An apparatus for controlling an angle of a light axis of light to be radiated from headlights mounted on a vehicle, comprising:
   angle changing means for changing the direction of the light axis of the light at an angle commanded by a command;
   image capturing means for capturing images of a field of view in front of the vehicle and providing captured images;
   taillight detecting means for using the captured images to detect taillights of a preceding vehicle which runs ahead of the vehicle provided with the apparatus;
   position setting means for setting an illumination target position using, as a positional reference, a position of the detected taillights in the captured images;
   angle calculating means for calculating the angle of the light axis of the light so that the light axis is directed to the illumination target position; and
   angle commanding means for providing the command to the angle changing means, the provided command depending on the angle calculated by the angle calculating means;

wherein the angle calculating means includes first means for calculating an angle between a view direction of the image capturing means and a direction viewing from the apparatus to the target radiation position, second means for determining the vehicle provided with the apparatus is in a predetermined acceleration or a predetermined deceleration, and third means for filtering the angles captured by the first means for a predetermined period of time depending on a determined result of the second means.

16. An apparatus for controlling an angle of a light axis of light to be radiated from headlights mounted on a vehicle, comprising:
   an angle changing device that changes the direction of the light axis of the light at an angle commanded by a command;
   an image capturing device that captures images of a field of view in front of the vehicle and providing captured images;
   a taillight detecting device that uses the captured images to detect taillights of a preceding vehicle which runs ahead of the vehicle provided with the apparatus;
   a position setting device that sets a illumination target position using, as a positional reference, a position of the detected taillights in the captured images; an angle calculating device that calculates the angle of the light axis of the light so that the light axis is directed to the illumination target position; and
   an angle commanding device that provides the command to the angle changing device, the provided command depending on the angle calculated by the angle calculating device, wherein
   the angle calculating device includes a first device for calculating an angle between a view direction of the image capturing device and a direction viewing from the apparatus to the target radiation position, a second device for determining the vehicle provided with the apparatus is in a predetermined acceleration or a predetermined deceleration, and a third device for filtering the angles captured by the first device for a predetermined period of time depending on a determined result of the second device.

* * * * *

UNITED STATES PATENT AND TRADEMARK OFFICE
CERTIFICATE OF CORRECTION

PATENT NO. : 8,351,648 B2  
APPLICATION NO. : 12/207778  
DATED : January 8, 2013  
INVENTOR(S) : Kamioka et al.

Page 1 of 1

It is certified that error appears in the above-identified patent and that said Letters Patent is hereby corrected as shown below:

Title Page, in the section that begins with ( * ) please remove the following:

"This patent is subject to a terminal disclaimer"

Signed and Sealed this  
Nineteenth Day of March, 2013

Teresa Stanek Rea  
*Acting Director of the United States Patent and Trademark Office*